United States Patent
Li et al.

(10) Patent No.: US 8,549,027 B2
(45) Date of Patent: Oct. 1, 2013

(54) COMPUTER-IMPLEMENTED SYSTEMS AND METHODS FOR EFFICIENTLY SELECTING DATA IN MULTI-DIMENSIONAL HIERARCHICAL SPACE WITH MULTIPLE CONSTRAINTS

(75) Inventors: Zhiyong Li, Chapel Hill, NC (US); Rajesh Hotchandani, Raleigh, NC (US); Austin Patrick Maher, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 458 days.

(21) Appl. No.: 12/487,134

(22) Filed: Jun. 18, 2009

(65) Prior Publication Data

US 2010/0325586 A1    Dec. 23, 2010

(51) Int. Cl.
*G06F 7/00* (2006.01)

(52) U.S. Cl.
USPC .......... 707/766; 707/783; 707/950; 707/958; 705/7.11; 705/7.28; 705/7.38; 715/841; 715/854

(58) Field of Classification Search
None
See application file for complete search history.

(56) References Cited

U.S. PATENT DOCUMENTS

| | | | |
|---|---|---|---|
| 7,006,992 B1 * | 2/2006 | Packwood | 705/38 |
| 7,266,549 B2 | 9/2007 | De Souza et al. | |
| 7,644,371 B2 | 1/2010 | Robertson et al. | |
| 7,756,896 B1 * | 7/2010 | Feingold | 707/791 |
| 2004/0122820 A1 * | 6/2004 | Malloy et al. | 707/6 |
| 2004/0181543 A1 * | 9/2004 | Wu et al. | 707/102 |
| 2007/0067414 A1 * | 3/2007 | Dayon | 709/217 |
| 2007/0208600 A1 | 9/2007 | Babus et al. | |
| 2007/0233621 A1 | 10/2007 | De Souza et al. | |
| 2008/0172636 A1 * | 7/2008 | Danas | 715/835 |
| 2008/0201309 A1 * | 8/2008 | Baumgartner et al. | 707/4 |
| 2009/0187552 A1 * | 7/2009 | Pinel et al. | 707/5 |
| 2010/0138449 A1 | 6/2010 | Williamson | |
| 2010/0250412 A1 * | 9/2010 | Wagner | 705/31 |
| 2012/0110022 A1 | 5/2012 | Hoang et al. | |

* cited by examiner

*Primary Examiner* — Anh Tai Tran
(74) *Attorney, Agent, or Firm* — Kilpatrick Townsend & Stockton LLP

(57) ABSTRACT

Computer-implemented systems and methods are provided for reducing a number of options presented to a user where the options have characteristics that are arranged in a multi-dimensional hierarchical space. A system and method can be configured to identify common dimensions using dimension nodes in dimensional points and identify compatible nodes for each dimension in the multi-dimensional hierarchical space by determining whether an association exists. Compatible pairs of surviving points are generated after applying each of the compatible nodes from the common dimensions. Greatest lower bounds (GLBs) are computed for each of the generated compatible points, and a set of options is generated comprising points from the generated compatible points and the computed GLBs.

18 Claims, 15 Drawing Sheets

| Dim Relation Name | Management Organization | Process | Risk Category |
|---|---|---|---|
| Process Execution Map | MO1: iFinance > Retail Banking | Process: P3 Customer Services | |
| Process Exposure Map | | Process: P3 Customer Services | RC 1.1.1 Business Practices > Diversity and Discrimination > Discrimination |

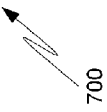

FIG. 7

| Intersection | | | |
|---|---|---|---|
| Process Execution Map ∩ Process Exposure Map | MO1: iFinance > Retail Banking | Process: P3 Customer Services | RC 1.1.1 Business Practices > Diversity and Discrimination > Discrimination |

FIG. 8

| Dim Relation Name | Management Organization | Process | Risk Category |
|---|---|---|---|
| Process Execution Map | MO1: iFinance > Retail Banking | Process: P3 Customer Services | |
| Process Exposure Map | | Process: P3 Customer Services | RC 1.1.1 Business Practices > Diversity and Discrimination > Discrimination |
| Process Exposure Map | | Process: P3 Customer Services | RC 1.2.1 Business Practices > Suitability > Misuse of confidential client information |

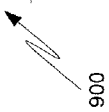

| User Role | Management Organization |  Geography |
|---|---|---|
| Risk Manager | MO1: iFinance > Retail Banking > Mortgage | GEO: 1.2 North America > United States |

| Intersection | Management Organization | Process | Geography | Risk Category |
|---|---|---|---|---|
| Process Execution Map ∩ Process Exposure Map ∩ Security | MO1: iFinance > Retail Banking > Mortgage | Process: P2.2.1 Support > HR > Recruit Staff | GEO: 1.2 North America > United States | RC: 1.1.1 Employment Practices > Diversity and Discrimination > Discrimination |

| User Role | Management Organization | Geography |
|---|---|---|
| Risk Manager | MO1: iFinance > Retail Banking > Mortgage | GEO: 2 EU |

| Intersection | Management Organization | Process | Geography | Risk Category |
|---|---|---|---|---|
| Process Execution Map ∩ Process Exposure Map ∩ Security | MO1: iFinance > Retail Banking > Mortgage | Process: P2.2.1 Support > HR > Recruit Staff | GEO: 2 EU | RC: 1.1.1 Employment Practices > Diversity and Discrimination > Discrimination |
| Process Execution Map ∩ Process Exposure Map | MO1: iFinance > Retail Banking > Mortgage | Process: P2.2.1 Support > HR > Recruit Staff | GEO: 2.3 EU > Germany | RC: 1.2.3 Employment Practices > Employee Relations > Organized Labor Action |

1600

| | FEATURE_NM | DIM_RELATION_RK | DIM_REL_NM |
|---|---|---|---|
| 1 | Event | -1 | Risk Exposure Map |
| 2 | Event | 10001 | Process Execution Map |

| | dim_rel_nm | dimension_nm | populated_record_cnt |
|---|---|---|---|
| 1 | Risk Exposure Map | RiskCategory | 705 |
| 2 | Risk Exposure Map | Process | 15 |
| 3 | Risk Exposure Map | ManagementOrg | 705 |
| 4 | Process Execution Map | Process | 101195 |
| 5 | Process Execution Map | ManagementOrg | 101195 |

| | INTERSECTION_TXT | DIMENSION_NM | NODE1_RK | NODE2_RK |
|---|---|---|---|---|
| 1 | -1,10001 | Process | 10020 | 10020 |
| 2 | -1,10001 | Process | 10036 | 10036 |
| 3 | -1,10001 | Process | 10041 | 10041 |
| 4 | -1,10001 | Process | 10042 | 10042 |
| 5 | -1,10001 | Process | 10043 | 10043 |
| 6 | -1,10001 | Process | 10044 | 10044 |

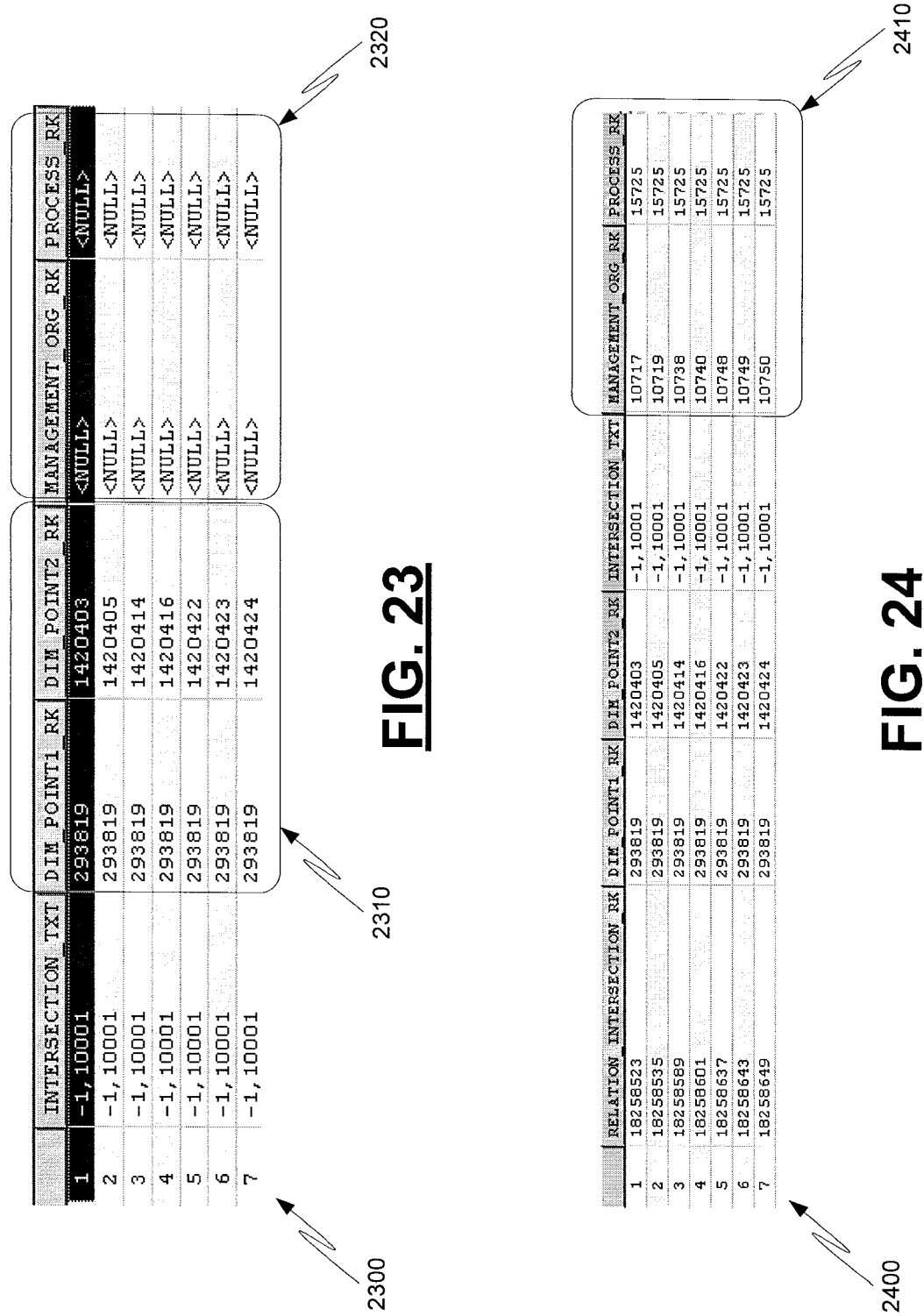

COMPUTER-IMPLEMENTED SYSTEMS AND METHODS FOR EFFICIENTLY SELECTING DATA IN MULTI-DIMENSIONAL HIERARCHICAL SPACE WITH MULTIPLE CONSTRAINTS

TECHNICAL FIELD

The technology described herein relates generally to systems and methods for reducing the size of an input data space. More specifically, the technology described herein relates to selecting data in a multi-dimensional hierarchical space with multiple constraints.

BACKGROUND

In many software applications, data is arranged along a series of dimensions. For example in a business application, data can be arranged along such dimensions as management organization, business line, geography, fiscal reporting period, etc. When users of an application create and manipulate data, the data is associated with combinations of values for the relevant dimensions. This introduces the potential for extremely large numbers of combinations, especially if there are a large number of dimensions and/or values along each dimension.

Given the large sets of constraints a company may have in place, calculating which dimensional combinations are valid can be a very expensive operation. For example, if there are two sets of constraints (e.g., a set of valid management organization/process mappings and a set of valid process/risk mappings) the most straight-forward approach would consist of examining every pair of mappings in two constraints and computing which management organizations, processes, and risks are applicable. Such an approach, however, can quickly lead to significant increases in the time and computational resources required to complete the reduction in the input space, as the number of dimensions involved and the size of the different mappings among dimensions increases.

As another example, where there are numerous dimensions and/or values along each dimension, it generally is true that not every possible combination is meaningful. Approaches, such as the naïve algorithm, are inefficient when searching for the intersection of two points. For example, if a process map constraint set contained approximately 100,000 mappings and an example risk map constraint set included 700 mappings, around 70 million combinations would have to be examined. If there were six potentially relevant dimensions for the two constraint sets, the number of low level tree node comparisons would be about 420 million node comparisons. A simple loop that computes a check or mathematical calculation 420 million times would take on the order of ten seconds to execute.

SUMMARY

In accordance with the teachings herein, computer-implemented systems and methods are provided for reducing the number of data options presented to a user where the options have characteristics that are arranged in a multi-dimensional hierarchical space. Examples of such computer-implemented systems and methods may include identifying common dimensions using dimension nodes in dimensional points, identifying compatible nodes for dimensions in the multi-dimensional hierarchical space by determining whether associations exists, generating compatible pairs of surviving points after applying compatible nodes from common dimensions, computing greatest lower bounds (GLBs) for generated compatible points, generating a set of options comprising points from the generated compatible points and the computed GLBs, and applying user-specific information to select a user subset of the set of options.

As another example, a system and method may be configured to not compare every point in one map (an area or all points in one constraint) with every point in another map. Instead, the example system and method may compare only points that are at least partially compatible. By avoiding incompatible combinations, the amount of processing needed may be reduced. In another example, it may be more efficient to work "vertically" (i.e., making comparisons one dimension at a time) than it is to work "horizontally" (i.e., making all of the comparisons for one record before moving on to the next record). This is true even if it were possible to perform all comparisons for a record in parallel. In yet another example, it may be more efficient to find the compatible points in one pass with several iterations, and then compute the GLBs on a second pass than it is to try to perform the two steps together while iterating over each row.

Other examples of computer-implemented systems and methods for reducing the number of options presented to a user can include computing the GLBs one dimension at a time when computing intersection points from compatible points, which improves efficiency. As another example, intersecting two maps may be done efficiently, while intersecting three or more maps is expensive, requires saving intermediate results, and should be computed in batch and stored. An additional example system and method recognizes that, in light of intersecting constrained areas with the current user's security permissions (which can be considered a constraint), all constraints other than the user security constraint may be pre-computed to produce the required intersections, while the intersections between the results of the multiple constraints and user's security constraint may be calculated "live," on a per-user, as-needed basis.

BRIEF DESCRIPTION OF DRAWINGS

FIGS. 7-16 are example user interfaces depicting aspects of a system for efficiently selecting data in a multi-dimensional hierarchical space.

FIGS. 20-22 are screenshots depicting example data structures for storing constraint and mapping information within an example system for efficiently selecting data in a multi-dimensional hierarchical space with multiple constraints.

FIGS. 23-24 are screenshots depicting example data structures for storing pre-computed results within an example system for efficiently selecting data in a multi-dimensional hierarchical space with multiple constraints.

DETAILED DESCRIPTION

Figure 1:
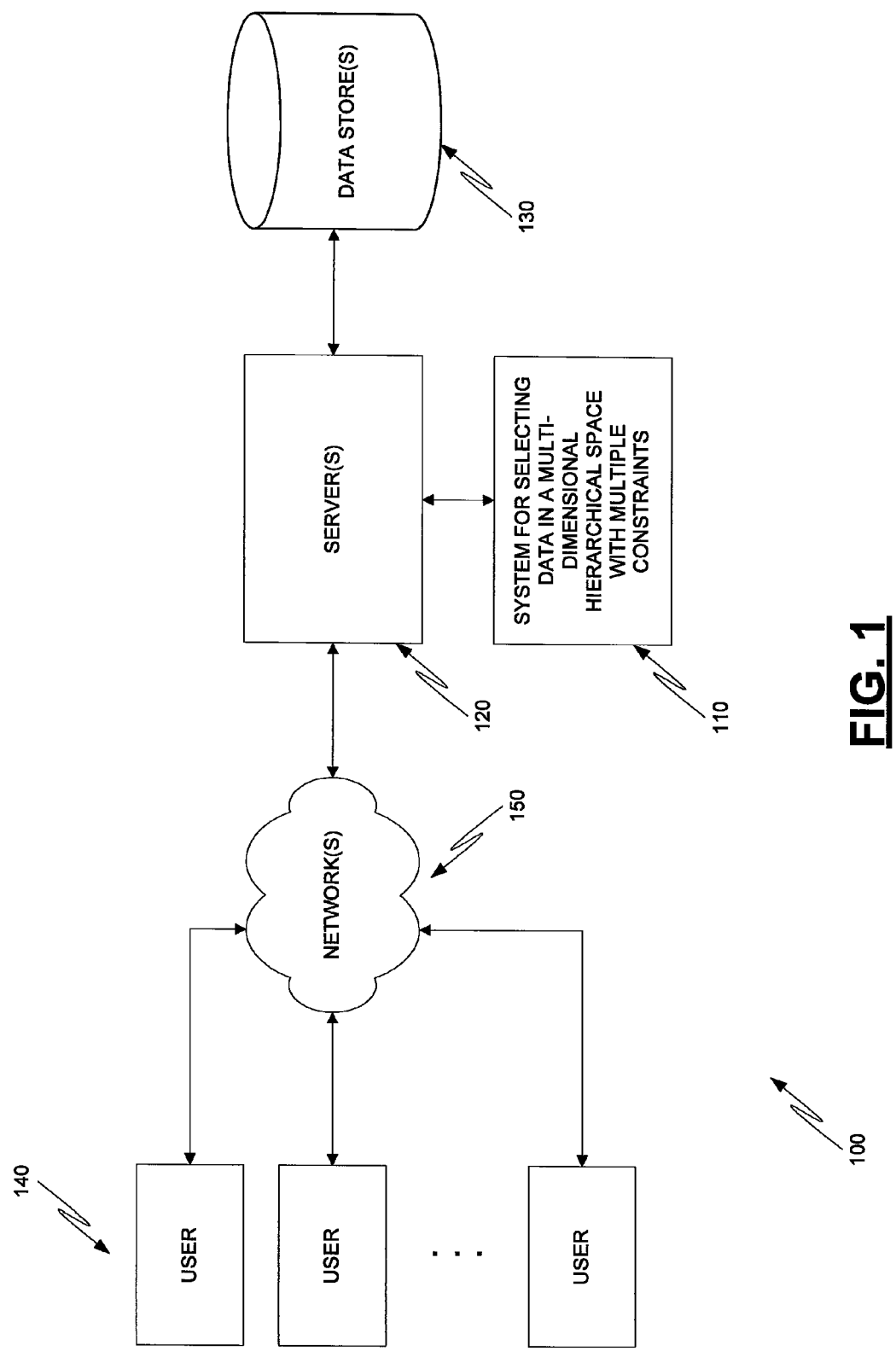
FIG. 1 is a block diagram depicting an environment in which users can interact with a system for efficiently selecting data in a multi-dimensional hierarchical space with multiple constraints.

FIG. 1 depicts at 100 an environment in which one or more users 140 can interact with an example system 110 that efficiently selects data in a multi-dimensional hierarchical space with multiple constraints for presentation to the users 140. For example, the system 110 can be used to automatically select which data options from a business application should be presented to a user based upon a number of constraints, such as data mappings or security constraints. The security constraint could indicate that certain users should not be permitted to view specific data options based upon the position they hold in a company and/or based upon the department of the company they might belong.

To facilitate processing of the multi-dimensional hierarchical space, the system 110 can allow one or more of the users 140 to associate business-related information (e.g., business artifacts) with "dimensional points" within the organization. For example, a user may associate: a loss associated with a risk the business may be confronting; the process that exposed the risk (and resulted in the loss); and the management organization that must absorb the loss. To build a dimensional point, the user chooses the appropriate node from each of the dimensional trees. The system 110 allows an organization to pre-define and use hierarchical dimensions (i.e., trees). The combination of all of the dimensions that an organization defines may be referred to as the organization's "dimensional space."

To provide such capabilities, the system 110 can be implemented on many different types of computer environments, such as on one or more servers 120 (which are shown in FIG. 1). In FIG. 1, the server(s) 120 may be connected to one or more data stores 130, which may store input data, output data, intermediate data, or any combination of such data that is used within the system 110. Users 140 may access the system 110 over one or more networks 150, which can include, for example, a local area network (LAN) or a wide area network (WAN), such as the Internet. The output from the system 110 may comprise an input to another system, such as a loss reporting system for a financial entity.

Figure 2:
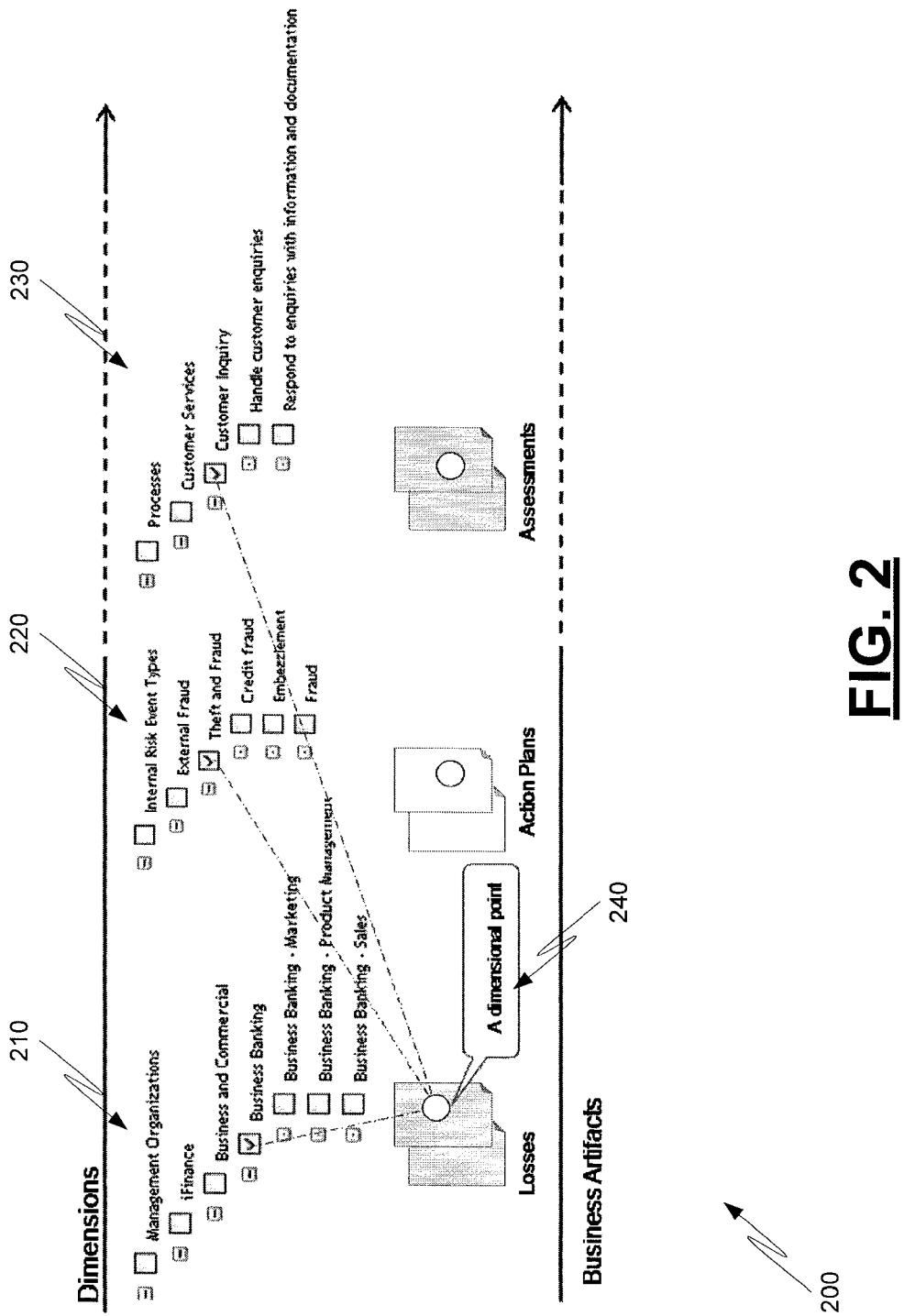
FIG. 2 is a block diagram depicting business objects within an example system for efficiently selecting data in a multi-dimensional hierarchical space with multiple constraints.

FIG. 2 depicts at 200 how dimensions in a multi-dimensional hierarchical space could interrelate with such business artifacts as losses, action plans, etc. As an illustration, dimensions along which a business might structure its data are depicted as the management organization dimension 210, the internal risk event type dimension 220, and the process dimension 230. Although there are millions (or even billions) of possible combinations in a company's dimensional space, only a small fraction are legitimate combinations in the context of that company. To help ensure coherent data entry, a risk management and compliance system can be configured to restrict the available combinations to comply with pre-defined constraints. For example, if a user wishes to specify the location of a loss, and the system is configured to require a valid management organization, process, and risk event type combination, the interaction might involve the following steps:

| User Action | System Reaction |
| --- | --- |
| User elects to begin with the management organization dimension 210. | The system presents to the user only management organizations that are associated with processes that are themselves associated with one or more risk event types. |
| User selects management organization from the constrained list. | The system adds the management organization to the selection. |
| User elects to browse the process dimension 230. | The system presents to the user only processes that are associated with the chosen management organization and are also associated with one or more risk event types. |
| User selects process from the constrained list. | The system adds the process to the selection. |
| User elects to browse the internal risk event type dimension 220. | The system presents to the user only risk event types that are associated with the chosen management organization and the chosen process. |
| User selects risk event type from the constrained list. | The system adds the risk event type to the selection. |
| User accepts the selected location. | The system associates the location with the loss. |

Figure 3:
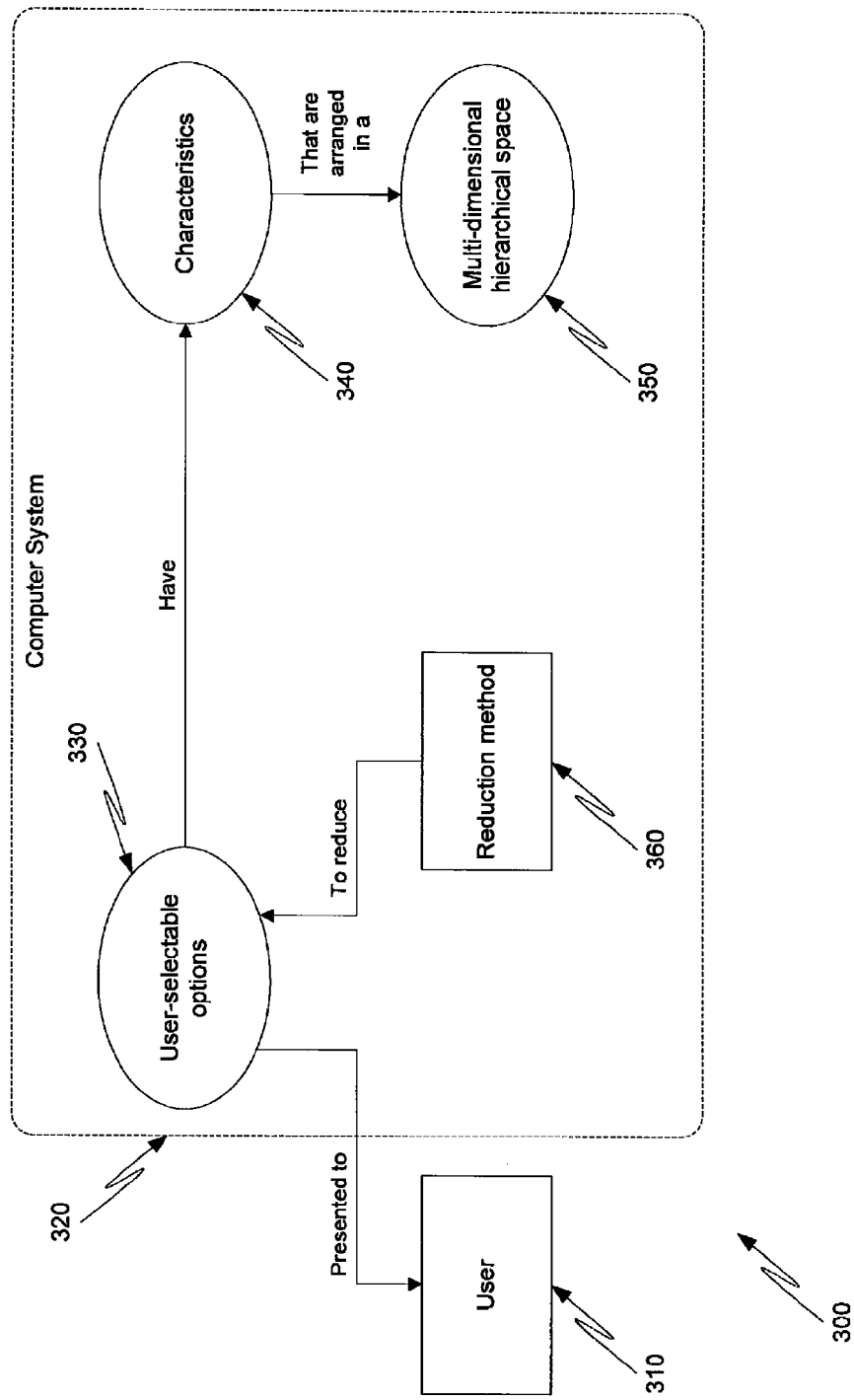
FIG. 3 is a block diagram depicting relationships among various aspects of an example system for efficiently selecting data in a multi-dimensional hierarchical space with multiple constraints.

These associations are used by the system to efficiently select data for presentation to a user. As an example of a selection process, FIG. 3 depicts at 300 a user 310 interacting with a computer system 320 which presents to the user 310 a set of user-selectable options 330. An example of the computer system 320 could be a loss reporting computer system for a financial entity, which presents options to a user in order to guide the user's entry of information into the system regarding a loss suffered by the financial entity.

The options 330 have characteristics 340 which could include aspects such as the business unit of the financial entity that is associated with a loss or the type of loss suffered by the financial entity. The characteristics 340 are arranged in a multi-dimensional hierarchical space 350. The arrangement of the characteristics 340 in the multi-dimensional hierarchical space 350 can include nodes that are not considered valid, such as an intersection between a business unit and a type of loss that could not occur within that business unit. Because of the potential presence of such invalid nodes, a reduction method 360 is used to reduce the size of the set of user-selectable options 330 before the options 330 are presented to the user 310. Due to the potential presence of such invalid nodes, a reduction method 360 is used to reduce the size of the set of user-selectable options 330 before the options 330 are presented to the user 310. Valid node combinations in multi-dimensional space 350 are determined using characteristics 340 that indicate associations (mappings) between dimension nodes. These mappings are used as constraints in the reduction method 360. For example, mappings between management organization nodes and the processes they should follow or mappings between processes and the risks to which they are exposed. Mappings are dimensional areas consisting of one or more dimensional points. Dimensions can be viewed as hierarchical axes along which various business objects are arranged. Thus an example system could include management organization, process, product, and geography as dimensions along which business objects could be arranged. A collection of dimensional nodes may be referred to as a dimensional point, and a collection of dimensional points may be called a dimensional area.

Figure 4:
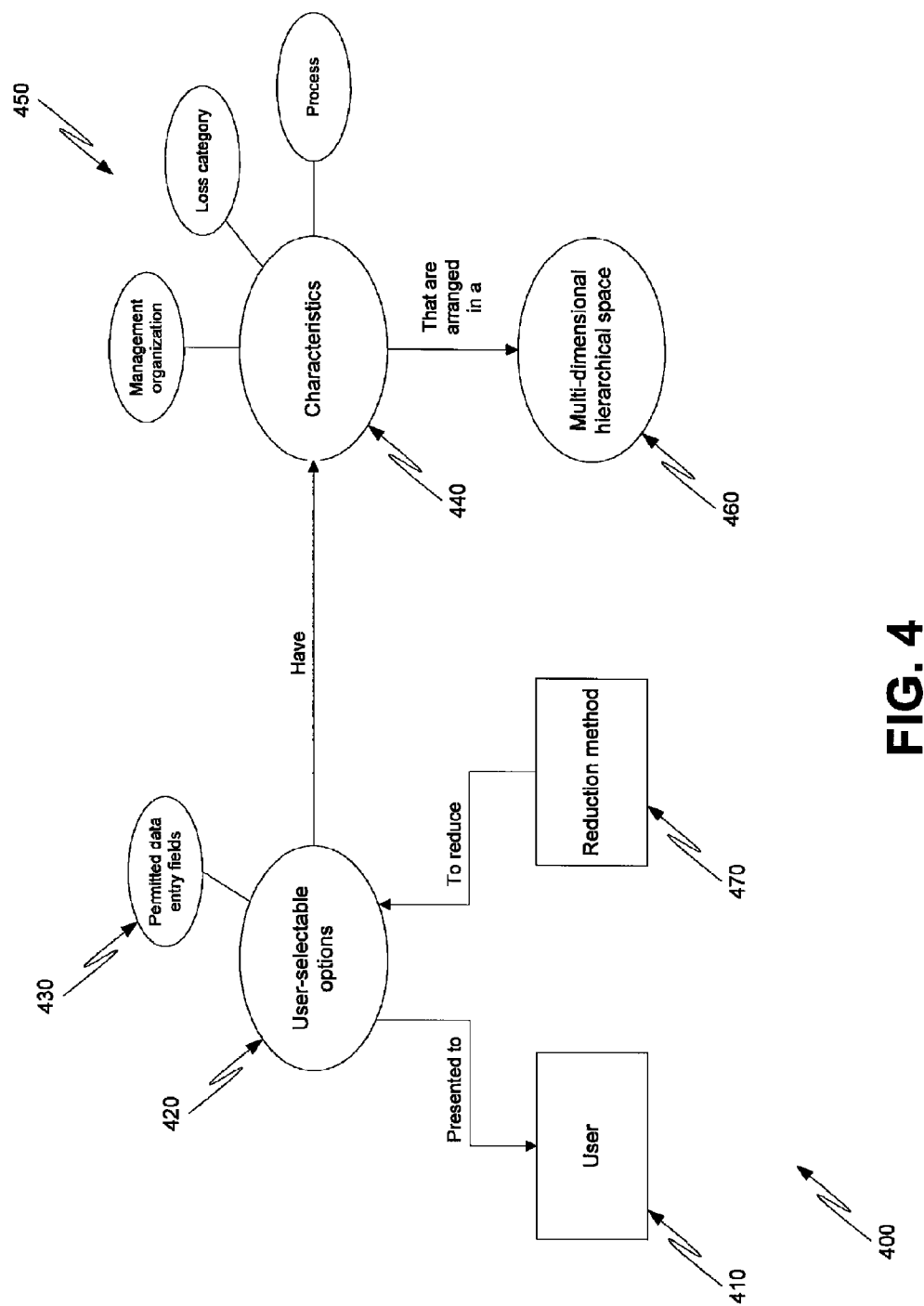
FIG. 4 is a block diagram depicting additional details regarding relationships among various aspects of an example system for efficiently selecting data in a multi-dimensional hierarchical space with multiple constraints.

FIG. 4 depicts at 400 additional details regarding relationships among various aspects of a system for efficiently reducing data in a multi-dimensional hierarchical space with multiple constraints. A user 410 is presented with a set of user-selectable options 420. In this example, the options 420 could represent permitted data entry fields 430. Thus, as described above, a user of a loss reporting system for a financial entity could be presented with a set of user-selectable options that has been restricted to only those data entry fields that are appropriate for the user's business unit and corporate position. The options 420 have characteristics 440, examples 450 of which include management organization, loss category, and process. In a loss reporting system, a loss thus could be within the equities trading management organization, and the loss category could be a trading loss. These characteristics 440 are arranged in a multi-dimensional hierarchical space 460. The system applies a reduction method 470 to the user-selectable options 420 before the options are presented to the user 410. Within the loss reporting example, the reduction method could, for example, exclude the node that represents a trading loss in the equities trading management organization if the user 410 is a teller at a retail branch of the financial entity. Such a user presumably would never have a need to report a trading loss in the equities trading operation, so the option need not be presented to the user. Each such reduction eliminates a potential source of erroneous data, which saves time and effort in investigation and/or clean-up.

Figure 5:
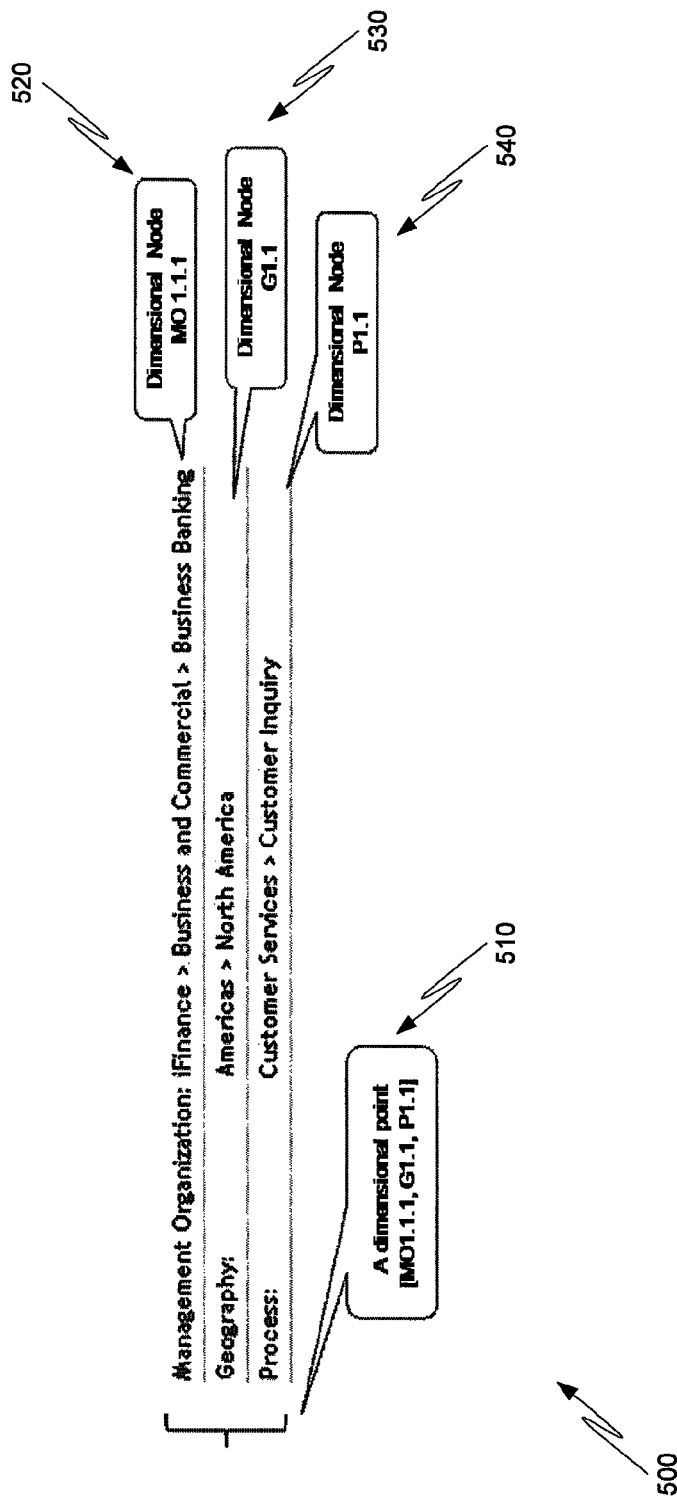
FIGS. 5 and 6 are example user interfaces depicting aspects of a multi-dimensional hierarchical space.

As an example of the components and data referenced in FIGS. 2 and 4, FIG. 5 depicts at 500 an example user interface displaying aspects of example components and data. The permitted data entry fields 430 can comprise the set of all dimensional points for an organization. An example dimensional point 510, similar to dimensional point 240, is shown in FIG. 5. A dimensional point 510 is itself a collection of dimensional nodes in which each dimension is represented no more than once. Thus, the dimensional point 510 includes dimensional node MO 1.1.1, depicted at 520, from the management organization dimension, similar to the dimension described at 210. Dimensional point 510 also includes dimensional nodes G 1.1, shown at 530, and P 1.1, shown at 540, which are from the geography and process dimensions. These further are similar to the characteristics described above at 450.

Figure 6:
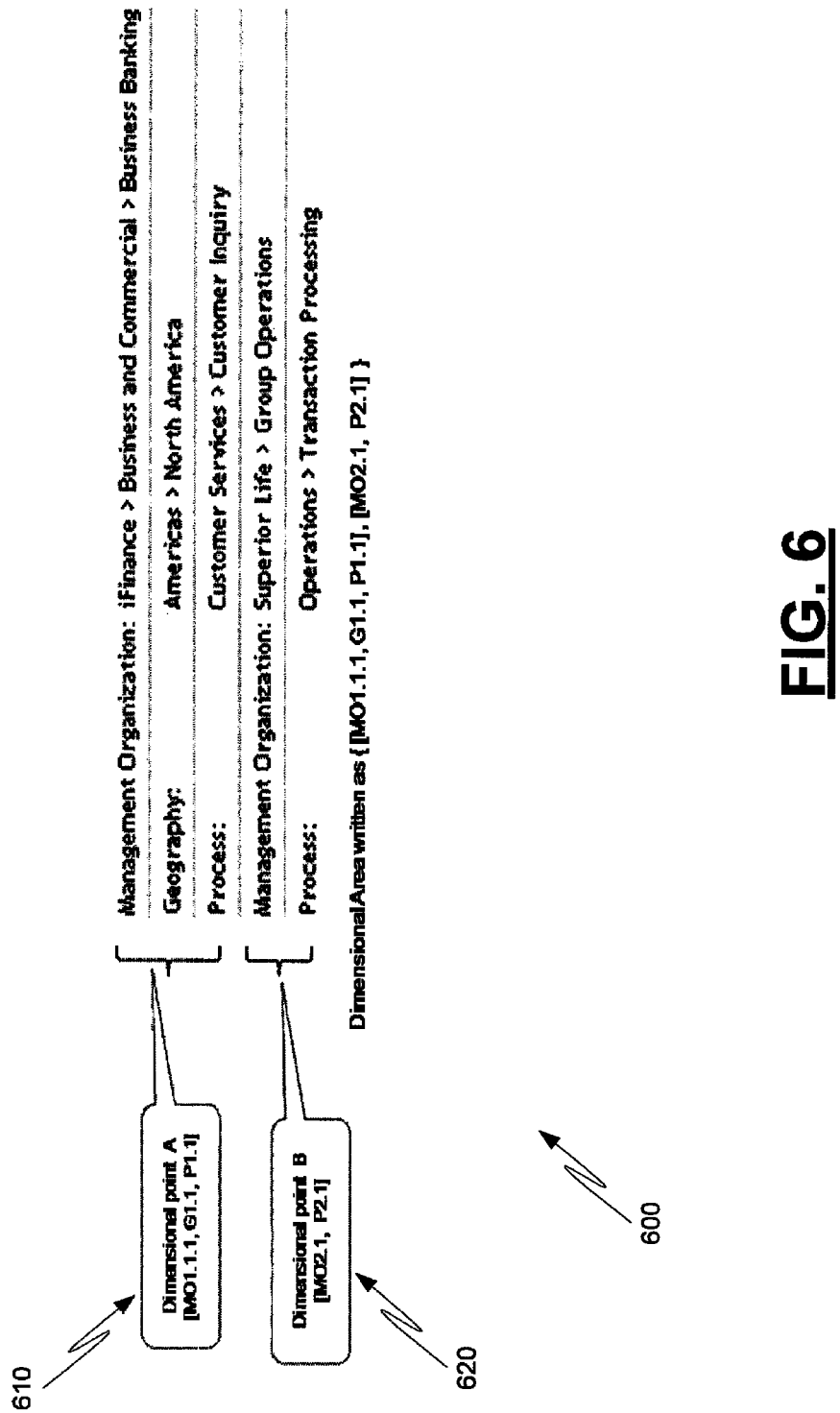
Figure 10:
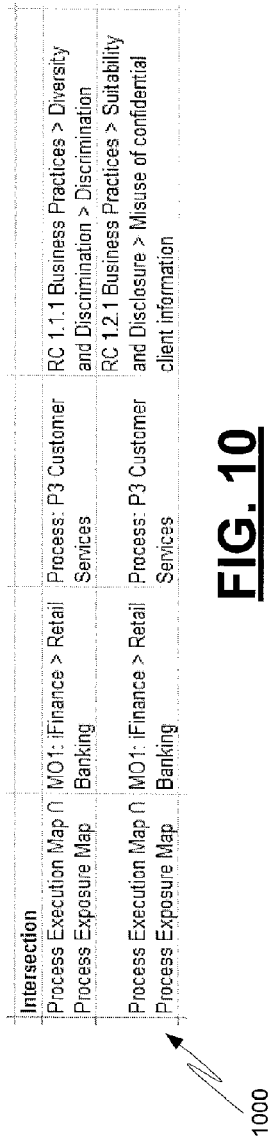
Figure 11:
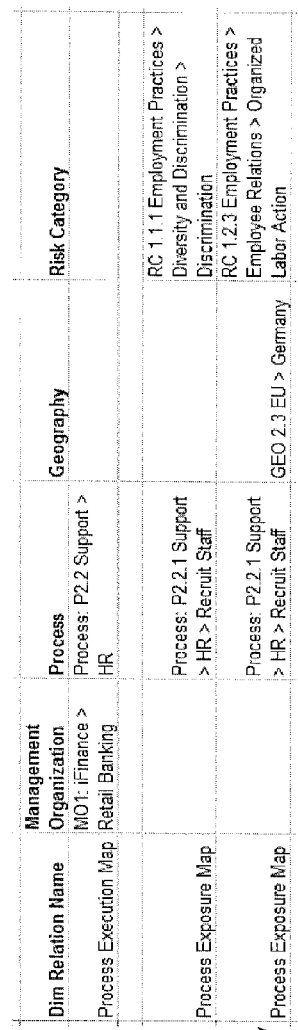
Figure 12:
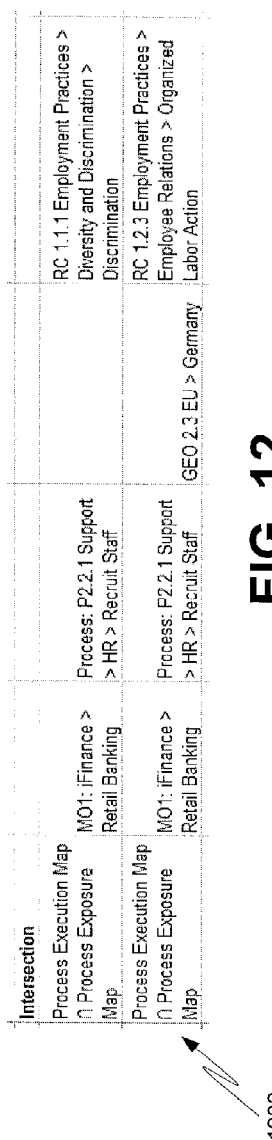

FIG. 6 depicts at 600 an additional example of the components and data referenced in FIGS. 2 and 4. Here, a dimensional area, which corresponds to the permitted data entry fields 430, is a collection of dimensional points, similar to the example dimensional points 240 and 510. Thus, dimensional point 610, which corresponds to example point 510, and dimensional point 620 are contained within the dimensional area. These would comprise permitted data entry fields, as shown at 430.

FIGS. 7-16 are example user interfaces depicting aspects of a system for efficiently selecting data in a multi-dimensional hierarchical space. At 700, the process execution map indicates that retail banking is associated with all of the customer services processes. The process exposure map indicates that customer services expose the company to the risk of discrimination. At 800, the intersection is shown. By analyzing the process execution map and process exposure map, it is shown that retail banking is exposed to the risk of customer discrimination. If the process exposure map included a second mapping, indicating that customer services processes are exposed to the risk of misusing confidential client information, as shown at 900, then an example of the resulting intersection would be as shown by the example user interface at 1000.

At 1100, a more complex example is presented. The examples in the previous figures have essentially equated intersection with comparing all points and looking for matches on the common dimensions. In the example at 1100, it is not a simple match on the common dimensions—the nodes in the common dimensions (only the process dimension in this case) are related but not equal. The dimensions are analogous to the example characteristics depicted at 450 in FIG. 4. In this example, the Retail Banking management organization uses Human Resource (HR) processes. One specific process—Recruit Staff—is exposed to two risks: a discrimination risk and a labor action risk (though the latter is only a risk in Germany). The intersection of this example data is shown at 1200. The result is the "greatest lower bound" (GLB) of the two points. Put another way, when the nodes in the two points have a parent-child relationship, the system takes the more specific node (i.e., the child). The intersection resulting from the example data is comparable to the permitted data entry fields 430 depicted in FIG. 4. This approach also obviates the need for computing tree node intersections and the greatest lower bounds of two points, which would take orders of magnitude more time—easily consuming several minutes of execution time in the best case.

Incorporating a user's permissions into the system's generation of an intersection provides a more complex example of the functioning of the system. At 1300, the example demonstrates that each user sees the valid set of combinations as a result of the system intersecting the general intersection map with the user security permissions. When intersecting with user security, the system behaves similarly to its behavior when generating other intersections. In this example, if the user were a risk manager for retail banking's mortgage business in the U.S., their security area would be as shown at 1300. By intersecting the user's security area, the system provides the valid combinations of management organizations, processes, geographies, and risk categories, as shown at 1400.

Another example of a user with a different security profile is presented at 1500. At 1500, the security area is shown for an example user who is a risk manager for retail banking's mortgage business in the European Union. As a result of differing security areas, different users will see different resulting intersections. The intersection seen by the example user corresponding to the security area shown at 1500 is as shown 1600.

Figure 17:
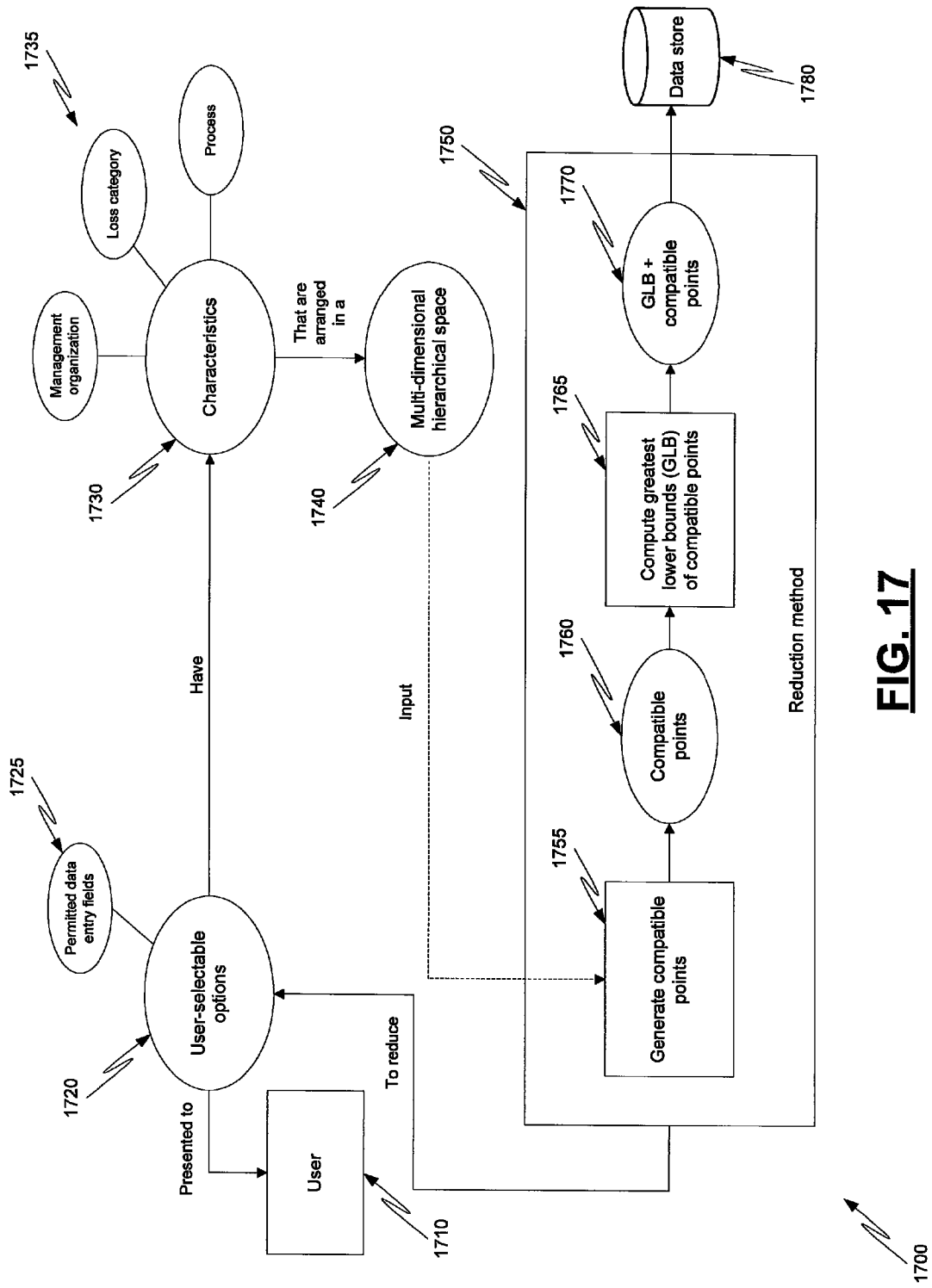
FIG. 17 is a block diagram depicting an example system for efficiently selecting data in a multi-dimensional hierarchical space with multiple constraints.

FIG. 17 depicts at 1700 an example system for efficiently selecting data in a multi-dimensional hierarchical space with multiple constraints. The user 1710 interacts with the system and a set of user-selectable options 1720 is presented to the user 1710. As previously described, the options 1720 could be limited to only permitted data entry fields 1725. The options 1720 have characteristics 1730. Examples 1735 of such characteristics include management organization, loss category, and process. Further the characteristics 1730 are arranged in a hierarchical multi-dimensional space 1740. The characteristics 1730 arranged in the hierarchical multi-dimensional space 1740 are input to the reduction method 1750, which is used to reduce the set of user-selectable options 1720 before the options 1720 are presented to the user 1710. The reduction method 1750 includes several stages. At 1755, compatible points within the multi-dimensional hierarchical space are generated. The compatible points 1760 are used to generate the greatest lower bounds (GLB) for the compatible points, as depicted at 1765. In this way, for example, if a manager has all of the permissions of one of the manager's subordinates, then the use of GLBs can ensure that any compatible points identified for such a subordinate also are included in the set of options presented to the manager. Once the GLBs are computed, the GLBs are combined with the compatible points. The resulting set 1770 may be output to a data store 1780. The result also becomes the reduced set of user-selectable options 1720 that is presented to the user 1710.

Figure 18:
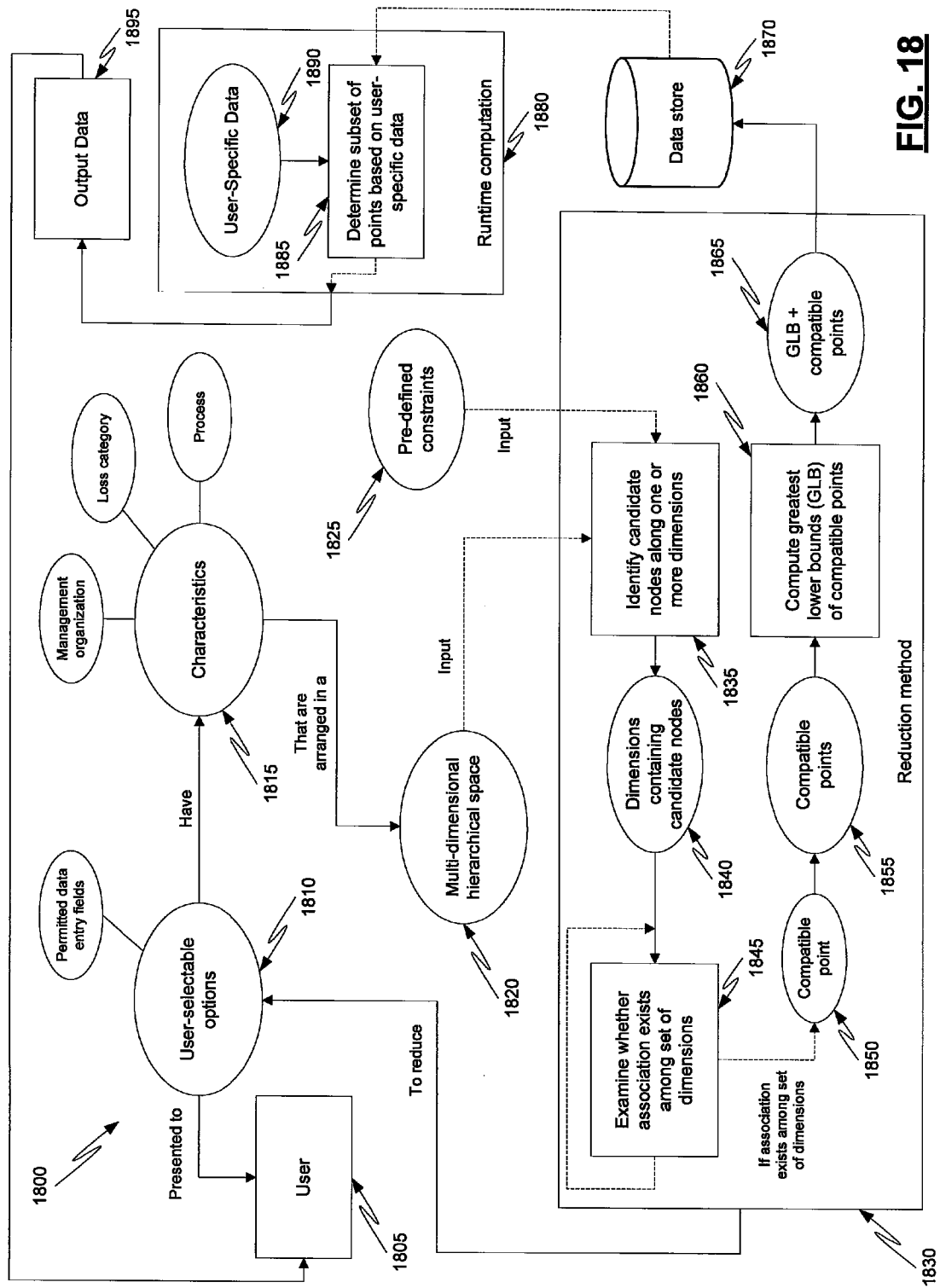
FIG. 18 is a block diagram depicting another example system for efficiently selecting data in a multi-dimensional hierarchical space with multiple constraints.

FIG. 18 depicts at 1800 another example system for efficiently selecting data in a multi-dimensional hierarchical space with multiple constraints. The user 1805 is presented a set of user-selectable options 1810, which have characteristics 1815. The characteristics are arranged in a multi-dimensional hierarchical space 1820. The characteristics arranged in a multi-dimensional hierarchical space are input to the reduction method 1830, as are the pre-defined constraints 1825. At 1835, the inputs are used to identify candidate nodes along one or more dimensions. This results in a set of dimensions that contain candidate nodes 1840. The set 1840 is a subset of the overall set of dimensions in the multi-dimensional hierarchical space. At 1845, the set 1840 is examined to determine whether an association exists among a set of dimensions. If an association among a set of dimensions is determined to exist at 1845, the result is a compatible point 1850. Once all of the sets of dimensions have been examined at 1845, the collected set of compatible points 1855 results. The GLBs of the compatible points in the set 1855 are determined, as shown at 1860. The result is a set 1865 including the compatible points and the GLBs. This data is stored in a data store 1870.

In the example system depicted at 1800, the reduction of the set of user-selectable options 1810 is split into two phases. The first phase proceeds as described above, and the output set 1865 comprises the input to the second phase, which is illustrated in this example as the runtime computation 1880. In this example system, a portion of the processing necessary to reduce the set of user-selectable options 1810 is performed at the time the user runs the system. Thus, the set 1865 is stored in data store 1870 as intermediate data. As an illustration when the user 1805 uses the example loss reporting system, the processing (labeled as runtime computation 1880) takes place. As shown at 1885, the runtime computation 1880 combines the intermediate data from data store 1870 and user-specific data 1890 to generate the reduced set of user-selectable options, which is depicted as output data 1895. The output data 1895 is analogous to the intersection result depicted at 1600 in FIG. 16, wherein an example user's security area (an example of user-specific data 1890) has been intersected with the set of compatible points and GLBs 1865.

Figure 19:
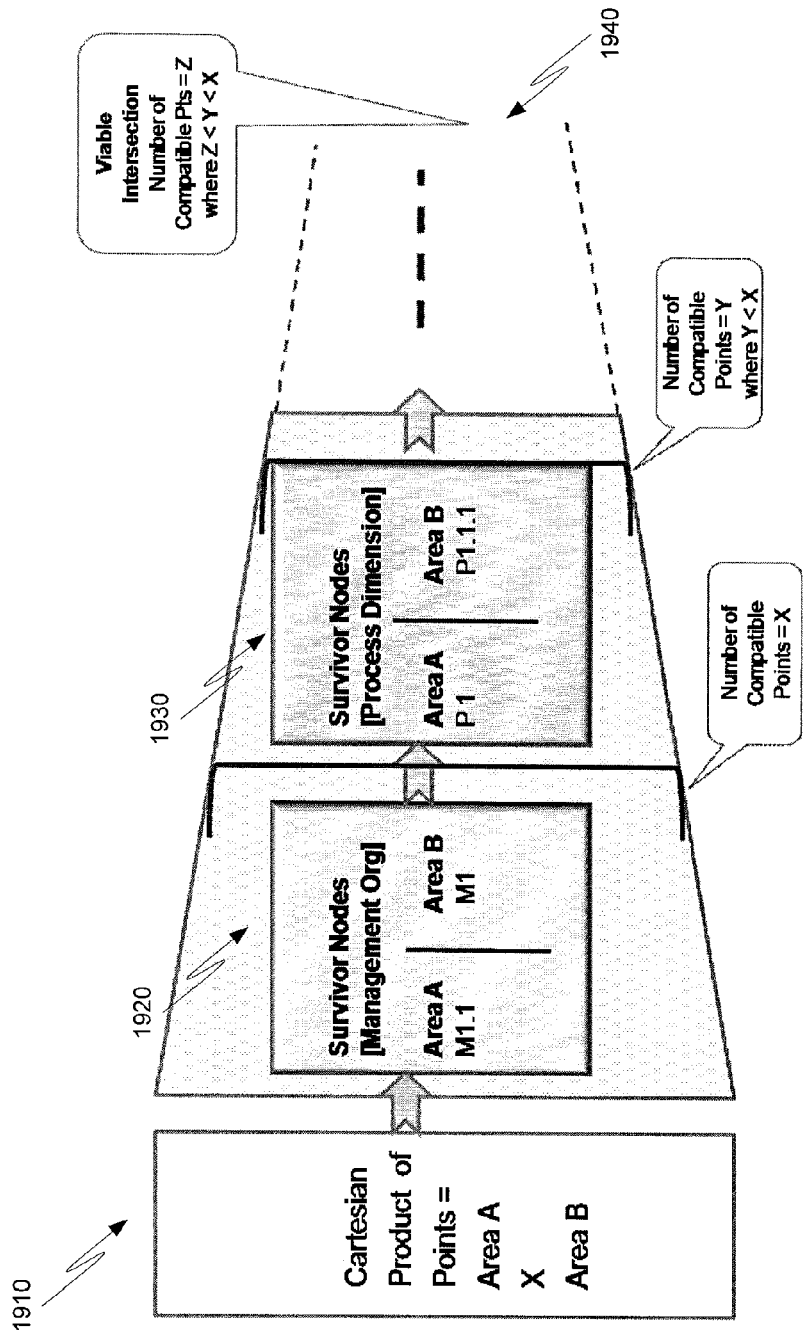
FIG. 19 is a block diagram depicting the narrowing of compatible node pairs as the number of dimensions tested increases within an example system for efficiently selecting data in a multi-dimensional hierarchical space with multiple constraints.

FIG. 19 depicts at 1900 elements of the operation of an example system for efficiently selecting data in a multi-dimensional hierarchical space with multiple constraints. The example depicted at 1900 illustrates the case of intersecting two areas (i.e., constraint sets). When it is necessary to intersect three or more constraint sets, generally the process would begin with intersecting two constraint sets (frequently, the two smallest) and then repeatedly intersecting the results with the remaining constraint sets (usually working from smallest to largest, as this will tend to minimize the number of comparisons and the size of the intermediate results).

The process may begin with the identification of compatible combinations. As shown at 1910, the system begins with an input comprising the Cartesian product of points contained in Areas A and B. The basis of the identification of compatible points is that two dimensional points X and Y can only survive and be considered compatible if all nodes in point X have a ancestor/descendant relationship with the corresponding dimension node of the same type in point Y. The system determines dimensions that are common in the two areas (Area A and Area B) being intersected. These common dimensions are used to identify the compatible points between the two areas. (Note: if two relationships do not share a common dimension, they do not interact with each other and can be considered independent.) The system continues by identifying the candidate areas to be intersected by identifying which constraint sets are associated with the current "feature" of the system. Programmatically, such an example could be represented as:

```
SELECT
    FEATURE_NM, DIM_RELATION_RK, DIM_REL_NM
FROM
    FEATURE_CONSTRAINT_MAP A,
    DIM_RELATION_L B
WHERE
    FEATURE_NM = 'Event'
AND A.DIM_RELATION_RK = B.DIM_RELATION_RK
```

The above example programmatic statements refer to a model database table, an example of which is shown in the screenshot depicted in FIG. 20. The system then can collect meta information about the two constraint sets (Areas A and B) by identifying which dimensions participate in each relationship and how many records in the constraint set include each dimension. Then, for each dimension, the system determines how many constraints include a value from that dimension and determines common populated dimensions in Areas A and B. An example programmatic representation of this would be:

| Management Organization dimension | Process dimension |
|---|---|
| SELECT<br>  COUNT(*) AS populated_record_cnt<br>FROM<br>  DIM_RELATION_ELT_L dre,<br>  DIM_POINT_L dp<br>  WHERE<br>  (<br>  dp.MANAGEMENT_ORG_RK IS NOT NULL<br>  )<br>  AND dp.DIM_POINT_RK = dre.DIM_POINT_RK<br>  AND dre.DIM_RELATION_RK = 10001 | SELECT<br>  COUNT(*) AS populated_record_cnt<br>FROM<br>  DIM_RELATION_ELT_L dre,<br>  DIM_POINT_L dp<br>  WHERE<br>  (<br>  dp.PROCESS_RK IS NOT NULL<br>  )<br>  AND dp.DIM_POINT_RK =<br>  dre.DIM_POINT_RK<br>  AND dre.DIM_RELATION_RK = 10001 |

The system then determines common populated dimensions in Area A and Area B, which may be represented programmatically as:

```
SELECT
    DIM_REL_NM,
    DIMENSION_NM,
    POPULATED_RECORD_CNT
FROM
    COMMON_DIMENSION_INFO DIM_INFO,
    DIM_RELATION_L REL_INFO
WHERE
    REL_INFO.DIM_RELATION_RK IN (10001, -1)
AND REL_INFO.DIM_RELATION_RK =
DIM_INFO.DIM_RELATION_RK
```

The above example programmatic statements refer to a model database table, an example of which is shown in the screenshot depicted in FIG. 21. The system continues by identifying survivor point pairs from Areas A and B by searching along each common dimension. The points that remain for a given dimension, as depicted at 1920 and 1930, have a parent-child relationship between the nodes in the two points. (In the data model, parent-child relationships are found by searching an ancestor-descendent association table. The association table has records that map each node in the dimensional tree to all the nodes above it in the tree.) As each common dimension is processed, any node pair that gets eliminated for one dimension will not make it to the resulting compatible point pairs table. By restricting the search to pairs of points that have a parent-child relationship for all common dimensions, the algorithm eliminates the need to compare all combinations of points. For example, if process and management organization are the two common dimensions, the algorithm will first identify all compatible points along the process dimension and then it will identify the compatible points along the management organization dimension. In the same manner this query is repeated for the management organization dimension—the other common dimension identified. In general, these steps would be repeated for each common dimension. An example programmatic representation of this portion of the system would be:

```
INSERT
  INTO
    SURVIVOR_NODE(
      NODE1_RK,
      NODE2_RK,
      INTERSECTION_TXT,
      DIMENSION_NM
    )
    SELECT
        COALESCE(A.dimRkCol, 'ROOT') AS NODE1_RK
        ,COALESCE(B.dimRkCol, 'ROOT') AS NODE2_RK
        ,'-1,10001' AS INTERSECTION_TXT
        ,'Process' AS DIMENSION_NM
      FROM
        (
          SELECT
            DISTINCT dp.PROCESS_RK AS dimRkCol
          FROM
            DIM_RELATION_ELT_L dre,
            DIM_POINT_L dp
          WHERE
            dp.DIM_POINT_RK = dre.DIM_POINT_RK
            AND dre.DIM_RELATION_RK = 10001
        ) B
        ,PROCESS_ASSOC_L ASSOC
        ,(
      SELECT
        DISTINCT dp.PROCESS_RK AS dimRkCol
      FROM
        DIM_RELATION_ELT_L dre,
        DIM_POINT_L dp
      WHERE
        dp.DIM_POINT_RK = dpe.DIM_POINT_RK
        AND dre.DIM_RELATION_RK = -1
    ) A
    WHERE
      (
        (
          (
            COALESCE(A.dimRkCol, 'ROOT') = ASSOC.PROCESS_RK
          )
          AND ASSOC.ASSOC_TYPE_CD = 'DESCENDENT'
        )
        AND (
          COALESCE(B.dimRkCol, 'ROOT') = ASSOC.PARENT_PROCESS_RK
        )
      )
      OR (
        (
          (
            COALESCE(B.dimRkCol, 'ROOT') = ASSOC.PROCESS_RK
          )
```

```
        AND ASSOC.ASSOC_TYPE_CD = 'DESCENDENT'
      )
      AND (
        COALESCE(A.dimRkCol, 'ROOT') = ASSOC.PARENT_PROCESS_RK
      )
    )
  )
```

The above example programmatic statements refer to a model database table, an example of which is shown in the screenshot depicted in FIG. 22. The surviving node pairs from above are used to determine compatible point pairs 1940. The surviving node pairs that were determined for each compatible dimension (process and management organization in the example) are used to eliminate any points that do not contain a compatible node in one or more of the common dimensions. Programmatically, this could be represented as follows:

```
SELECT
    REL_INTR_RK_SEQ.nextval AS
    RELATION_INTERSECTION_RK,
    A.pointRk AS DIM_POINT1_RK,
    B.pointRk AS DIM_POINT2_RK,
    '-1,10001' AS INTERSECTION_TXT
FROM
    (
    SELECT
        snode.NODE1_RK AS node1Rk,
        snode.NODE2_RK AS node2Rk
    FROM
        SURVIVOR_NODE snode
    WHERE
        snode.INTERSECTION_TXT = '-1,10001'
        AND snode.DIMENSION_NM = 'ManagementOrg'
    ) cd2
    ,(
    SELECT DISTINCT
        dp.PROCESS_RK AS cd1NodeRk,
        dp.MANAGEMENT_ORG_RK AS cd2NodeRk,
        dp.DIM_POINT_RK AS pointRk
    FROM
        DIM_RELATION_ELT_L dre,
        DIM_POINT_L dp
    WHERE
        dp.DIM_POINT_RK = dre.DIM_POINT_RK
        AND dre.DIM_RELATION_RK = 10001
    ) B
    ,(
    SELECT
        snode.NODE1_RK AS node1Rk,
        snode.NODE2_RK AS node2Rk
    FROM
        SURVIVOR_NODE snode
    WHERE
        snode.INTERSECTION_TXT = '-1,10001'
        AND snode.DIMENSION_NM = 'Process'
    ) cd1
    ,(
    SELECT DISTINCT
        dp.PROCESS_RK AS cd1NodeRk,
        dp.MANAGEMENT_ORG_RK AS cd2NodeRk,
        dp.DIM_POINT_RK AS pointRk
    FROM
        DIM_RELATION_ELT_L dre,
        DIM_POINT_L dp
    WHERE
        dp.DIM_POINT_RK = dre.DIM_POINT_RK
        AND dre.DIM_RELATION_RK = -1
    ) A
WHERE
    (
    COALESCE(A.cd1NodeRk, 'ROOT') = cd1.node1Rk
    )
    AND (
        COALESCE(B.cd1NodeRk, 'ROOT') = cd1.node2Rk
    )
    AND (
        COALESCE(A.cd2NodeRk, 'ROOT') = cd2.node1Rk
    )
    AND (
        COALESCE(B.cd2NodeRk, 'ROOT') = cd2.node2Rk
    )
```

The above example programmatic statements refer to a model database table, an example of which is shown in the screenshot depicted in FIG. 23. After identifying the compatible pairs of points, the system builds the points that correspond to the greatest lower bounds (GLB) of the compatible pairs. To simplify this calculation, an "identify compatible points" algorithm may save the depth of each compatible dimension node with its list of compatible points. To build the list of new points, the populated dimensions for each compatible pair of points are examined. Populated dimensions do include all common dimensions plus any such dimension that do not have null values in either Area A or Area B. For one of the populated dimensions, the system examines the depth of the two compatible nodes and save the lower (i.e., deeper) node as the answer for that dimension. A programmatic example of this portion of the system is presented below. It should be noted that the programmatic example below logically updates the table with GLB information by selecting new records into a temporary table rather than updating existing records in an existing table. This example technique (copying into a new table and then replacing the original table with the temporary table) may be more efficient than a straight-forward update process.

```
CREATE
    TABLE RELATION_INTERSECTION_TMP_TMP AS
        SELECT
            TARGET_TABLE.RELATION_INTERSECTION_RK,
            TARGET_TABLE.dim_point1_rk,
            TARGET_TABLE.dim_point2_rk,
            TARGET_TABLE.intersection_txt,
            CASE
                WHEN e.level_no >= f.level_no THEN E.PROCESS_RK
                ELSE F.PROCESS_RK
            END AS PROCESS_RK,
            TARGET_TABLE.RESOURCE_DIM_RK,
            TARGET_TABLE.MANAGEMENT_ORG_RK,
            TARGET_TABLE.BL_RK,
            TARGET_TABLE.RISK_CAT_RK,
        FROM
            PROCESS_L E,
            PROCESS_L F,
            RELATION_INTERSECTION_TMP TARGET_TABLE,
            DIM_POINT_L SOURCE1,
            DIM_POINT_L SOURCE2
        WHERE
            TARGET_TABLE.dim_point1_rk =
            SOURCE1.DIM_POINT_RK
```

-continued

```
        AND TARGET_TABLE.dim_point2_rk =
            SOURCE2.DIM_POINT_RK
        AND COALESCE(SOURCE1.PROCESS_RK, 'ROOT') =
            E.PROCESS_RK
        AND COALESCE(SOURCE2.PROCESS_RK, 'ROOT') =
            F.PROCESS_RK
        AND TARGET_TABLE.INTERSECTION_TXT = '-1,10001'
```

The system repeats the step for each of the other populated dimensions. A programmatic example of this portion is:

```
        SELECT
            INTERSECTION_TXT,
            DIM_POINT1_RK,
            DIM_POINT2_RK,
            MANAGEMENT_ORG_RK,
            PROCESS_RK
        FROM
            RELATION_INTERSECTION
        WHERE
            INTERSECTION_TXT = '-1,10001'
```

The above example programmatic statements refer to a model database table, an example of which is shown in the screenshot depicted in FIG. 24. The resulting list of points is the intersected area of the original two dimensional areas. In this way, the system can support significantly larger constraint sets than was previously possible. In addition, the system can enforce large, enterprise-wide constraint sets in an efficient manner and dynamically specialize the results based on each user's security settings. This capability allows large institutions to leverage their existing process maps and other enterprise relationships as constraints to ensure high fidelity data entry and tracking.

As described above, FIGS. 20-22 are screenshots depicting example data structures for storing constraint and mapping information for the programmatic examples cited above. At 2000, the user interface depicts two rows, with the first row representing "Area A" as discussed in the previous example, and the second row representing "Area B." At 2100, the dimensions associated with each of the areas are listed. At 2110, the common dimensions between Areas A and B are indicated. At 2200, information about nodes on the process dimension is illustrated, and at 2210, the compatible node pairs within the process dimension are indicated.

FIGS. 23-24 are additional screenshots depicting example data structures for storing pre-computed results for the programmatic examples cited above. At 2300, the compatible points found in both all of the common dimensions are listed. The compatible points are indicated at 2310, while at 2320, the final two columns illustrate that the GLB for the compatible points have not yet been computed. At 2400, additional information about the compatible points is presented, and in this example, as seen at 2410, the GLBs have been computed for the management organization and process dimensions.

Figure 25:
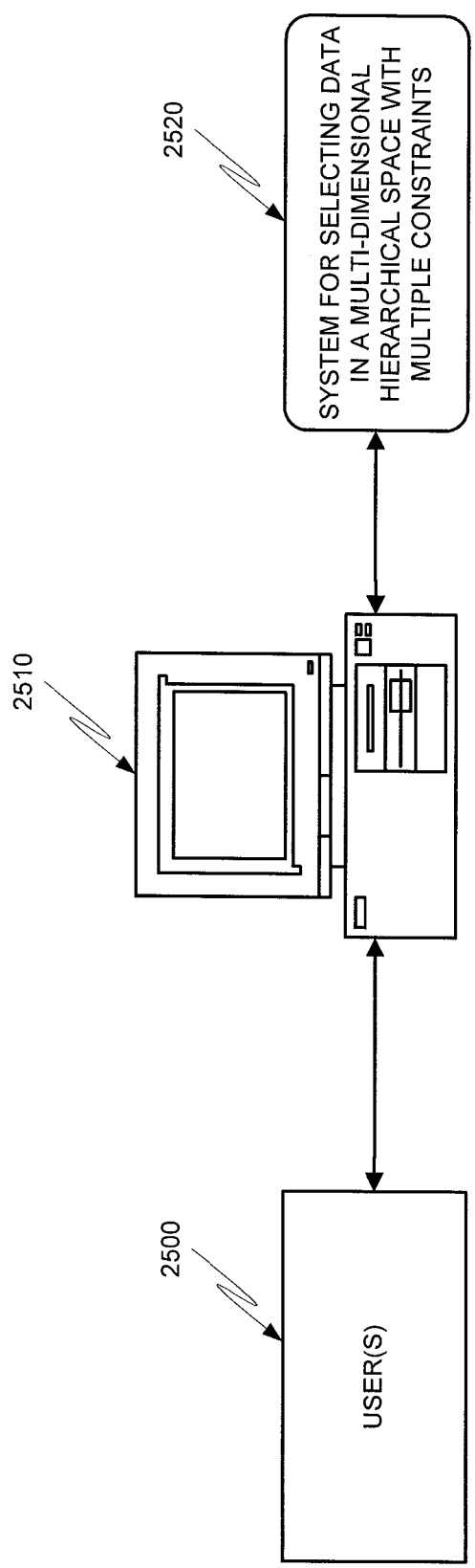
FIG. 25 is a block diagram depicting a single general-purpose computer environment wherein a user can interact with a system for efficiently selecting data in a multi-dimensional hierarchical space with multiple constraints.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer (as shown at 2510 on FIG. 25) or workstation, operated by one or more users 2500 interacting with a system for selecting data in a multi-dimensional hierarchical space with multiple constraints 2520, or on a networked system, or in a client-server configuration, or in an application service provider configuration.

As another example of the wide scope of the systems and methods disclosed herein, users 2500 are typically assigned to one or more roles in an organization. Each role dictates what permission a user has at a particular location. Following general security practices, permissions assigned at a given location are interpreted to mean the permissions are applicable at that location and anywhere below that location. Since a user may have multiple roles—each defined for a different location in the dimensional space—the user's scope of permissions can also be modeled as an area with multiple dimensional points. This security area can be analyzed in the exact same manner as the area defined by a constraint set. So, filtering data based on a user's permissions can be implemented by doing an extra intersection between the global relation intersection information and the user's area of permissions. Unlike the more general constraint sets defined between dimensions, which generally apply equally for all users, a user's security area is unique to that user and should be cached specifically for them. Although the resulting scope of permissions could be pre-computed and cached up front for each of users 2500, it may be more practical and efficient to compute each user's scope of permissions as needed (e.g., when a user interacts with the system 2520). When a user is searching through the dimensional space, they typically choose or adjust one dimension at a time (e.g., they choose a management organization and then they choose a process and then they choose a risk, etc.) Since users can only modify one dimension at a time, the final step in the process is to collapse/project the results of the intersection to their current dimension of interest. In the context of a specific user, the filtering based on user permissions and the projection down to a single dimension of interest can be done concurrently.

Further, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

In addition, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program. For example, the various cluster structures described herein can be stored in one or more data structures, such as in the following manner. A computer-readable storage medium has stored thereon cluster data structures that are created based upon a data set containing a plurality of input variables, the data structure comprising: a first data structure containing the data set; a second data structure containing one or more global clusters created by computing a distance matrix from the data set; a third data structure containing a global cluster structure; a fourth data structure containing a sub-cluster structure; and a fifth data structure containing a cluster structure formed by combining the global cluster structure and the sub-cluster structure; wherein the global cluster structure and the sub-cluster structure are created using a latent variable clustering technique.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of providing options for selection, comprising:
    accessing, using one or more data processors, a plurality of map records identifying associations between dimensions, wherein each dimension is associated with hierarchically arranged map records, and wherein each associated map record identifies a map record having an ancestor level associated with each of two dimensions;
    determining, using the one or more data processors, a plurality of matches between associated map records, wherein an associated map record match further associates dimensions and includes a match among map records and ancestor levels in a particular dimension;
    determining, using the one or more data processors, a lowest bound of a particular associated map record match, wherein the lowest bound identifies a lowest level map record in the particular dimension;
    receiving a selection of a map record corresponding to an associated dimension, wherein the selected map record is associated with an associated map record;
    filtering, using the one or more data processors, the plurality of associated map record matches using the selected map record;
    providing a first set of filtered options for the particular dimension using the determined lowest bound and the filtered associated map record matches; and
    providing a second set of filtered options for another dimension based on the filtered associated map record matches, wherein all of the filtered options and the associated dimensions are automatically selectable and displayed when selected using a graphical interface.

2. The method of claim 1, wherein a first associated map record and a second associated map record are determined to match based upon the first associated map record and an ancestor level of the second associated map record.

3. The method of claim 1, wherein a first associated map record and a second associated map record are determined to match based upon an ancestor level of the first associated map record and the second association map record.

4. The method of claim 1, wherein a first map record and a second associated map record are determined to match based upon the first associated map record and the second association map record.

5. The method of claim 1, further comprising:
    pre-filtering the associated map record matches based upon predefined constraints.

6. The method of claim 5, wherein the predefined constraints include a security-related constraint.

7. The method of claim 5, wherein the predefined constraints include business organization constraints.

8. The method of claim 1, further comprising:
    pre-filtering the associated map record matches based upon an identity of an accesser.

9. The method of claim 8, wherein pre-filtered associated map record matches displayed for selection are limited according to the pre-filtering.

10. The method of claim 8, wherein filtered options are associated with a bank.

11. The method of claim 10, wherein the accesser is an employee of a group at the bank.

12. The method of claim 1, wherein the dimensions include a management organization dimension, a geography dimension, a process dimension, or an internal risk event type dimension.

13. The method of claim 1, wherein filtering avoids selection of incompatible combinations.

14. The method of claim 13, wherein avoiding incompatible combinations reduces a number of filtered options displayed to an accesser.

15. The method of claim 13, wherein avoiding incompatible combinations reduces processing time for displaying filtered options.

16. The method of claim 13, wherein filtering includes removing incompatible combinations.

17. A computer-implemented system for providing options for selection, comprising:
    one or more processors;
    one or more computer-readable non-transitory storage mediums containing instructions configured to cause the one or more processors to perform operations including:
    accessing a plurality of map records identifying associations between dimensions, wherein each dimension is associated with hierarchically arranged map records, and wherein each associated map record identifies a map record having an ancestor level associated with each of two dimensions;

determining a plurality of matches between associated map records, wherein an associated map record match further associates dimensions and includes a match among map records and ancestor levels in a particular dimension;

determining a lowest bound of a particular associated map record match, wherein the lowest bound identifies a lowest level map record in the particular dimension;

receiving a selection of a map record corresponding to an associated dimension, wherein the selected map record is associated with an associated map record;

filtering the plurality of associated map record matches using the selected map record;

providing a first set of filtered options for the particular dimension using the determined lowest bound and the filtered associated map record matches; and providing a second set of filtered options for another dimension based on the filtered associated map record matches, wherein all of the filtered options and the associated dimensions are automatically selectable and displayed when selected using a graphical interface.

18. A computer-program product for providing options for selection, tangibly embodied in a machine-readable non-transitory storage medium, including instructions configured to cause a data processing apparatus to:

access a plurality of map records identifying associations between dimensions, wherein each dimension is associated with hierarchically arranged map records, and wherein each associated map record identifies a map record having an ancestor level associated with each of two dimensions;

determine a plurality of matches between associated map records, wherein an associated map record match further associates dimensions and includes a match among map records and ancestor levels in a particular dimension;

determine a lowest bound of a particular associated map record match, wherein the lowest bound identifies a lowest level map record in the particular dimension;

receive a selection of a map record corresponding to an associated dimension, wherein the selected map record is associated with an associated map record;

filter the plurality of associated map record matches using the selected map record;

provide a first set of filtered options for the particular dimension using the determined lowest bound and the filtered associated map record matches; and provide a second set of filtered options for another dimension based on the filtered associated map record matches, wherein all of the filtered options and the associated dimensions are automatically selectable and displayed when selected using a graphical interface.

* * * * *